| SELECTOR POSITION | VALVE POSITIONS | | | | |
|---|---|---|---|---|---|
| | 5 | 4 | 3 | 2 | 1 |
| HAND | OPEN | CLOSED | OPEN | OPEN | CLOSED |
| AUTO | CLOSED | OPEN | CLOSED | CLOSED | OPEN |

INVENTORS
MICHAEL PANICH
JACK F. SHANNON
AND PAUL S. DICKEY
BY Raymond W. Junkins
ATTORNEY

INVENTORS
MICHAEL PANICH
AND JACK F. SHANNON
PAUL S. DICKEY

United States Patent Office 2,731,023
Patented Jan. 17, 1956

2,731,023

BIAS ADJUSTING APPARATUS FOR FLUID PRESSURE CONTROL

Michael Panich, Mayfield Heights, Jack F. Shannon, Euclid, and Paul S. Dickey, East Cleveland, Ohio, assignors to Bailey Meter Company, a corporation of Delaware Application October 25, 1951, Serial No. 253,088

2 Claims. (Cl. 137—82)

Our invention relates to control systems operable automatically or manually to maintain substantially constant any desired electrical, thermal, chemical, physical or other variable condition through the control of a corrective agent or agents. More particularly, our invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value or manually for varying the condition as desired. The supply of the agent may be controlled by a device which is operated by fluid delivered at a pressure regulated by the system. When the system is switched from automatic to hand control, or vice versa, the pressure supplied to the device immediately after the switch-over should be the same as the pressure supplied before the switch was made, otherwise an operation of the device may be obtained to vary the agent so as to upset the whole system. It is therefore desirable that means be provided for regulating the pressure that will be supplied as well as for indicating the various pressures involved. The indication of the various pressures should be at the control station where the automatic-manual switch is made and they should be in such interrelation that desirable comparisons may be made between the incoming pressure and the outgoing pressure as well as intermediate transfer values, and the like.

It is also sometimes desired to provide the control station with a bias or modifying control which allows a modification of the outgoing control pressure in relation to the incoming loading pressure while the selector switch is on automatic position. This principle is particularly useful where two power units of different rating are to be operated by a single control pressure. In this case one power unit may be biased at a higher or lower control pressure than the other unit so that both power devices would be permitting equal flow of fuel, air, gas, etc. to a furnace fired vapor generator installation, for example.

To bias a unit or auxiliary is the act of decreasing or increasing by a specific amount any incoming loading pressure and is the equivalent of moving the characteristic curve a predetermined amount upward or downward to a position parallel therewith.

Bias is sometimes necessary when two auxiliaries are operating in parallel from the same loading pressure source, and it is desirable that either one of the auxiliaries lead or lag the other by a constant differential at all times. For example, a master selector switch may be controlling two or more pulverizer coal feeders with the same loading pressure. Each pulverizer branch will be equipped with a bias type selector station so that control pressures to the pulverizers may be biased either negatively or positively to correct for sluggishness, wear, rating, etc. of a pulverizer, so that all coal feeders to a single boiler furnace will ultimately be afforded equal fuel output rate irrespective of the operating characteristics of the particular feeder.

An object of our present invention is to provide an improved system for controlling a condition or an agent. Another object is to provide a system that may be adjusted for operation either automatically or manually to control the condition or agent. Still another object is to provide an improved system in which a valving mechanism is selectively operative for supplying fluid pressure from automatic or manual control means to a regulating device, and separate gages are provided for indicating the various fluid pressures in juxtaposition.

A further object is to provide a fluid pressure selective station having means for adjustably biasing the incoming loading fluid pressure to produce an outgoing control fluid pressure a predetermined fixed amount above or below the value of the incoming pressure. The adjustable means provide for varying the fixed bias amount between the incoming and outgoing at all rates of output.

A particular object is to provide an improved selector station for fluid pressure control systems, for selectively effecting either manual or automatic control.

Other objects will appear in the course of the following description.

In the drawing:

Fig. 1 is a side elevation, partially in section, of a fluid pressure selector station.

Fig. 2 diagrammatically illustrates the selector station of Fig. 1 in a simple control system.

Figure 1:
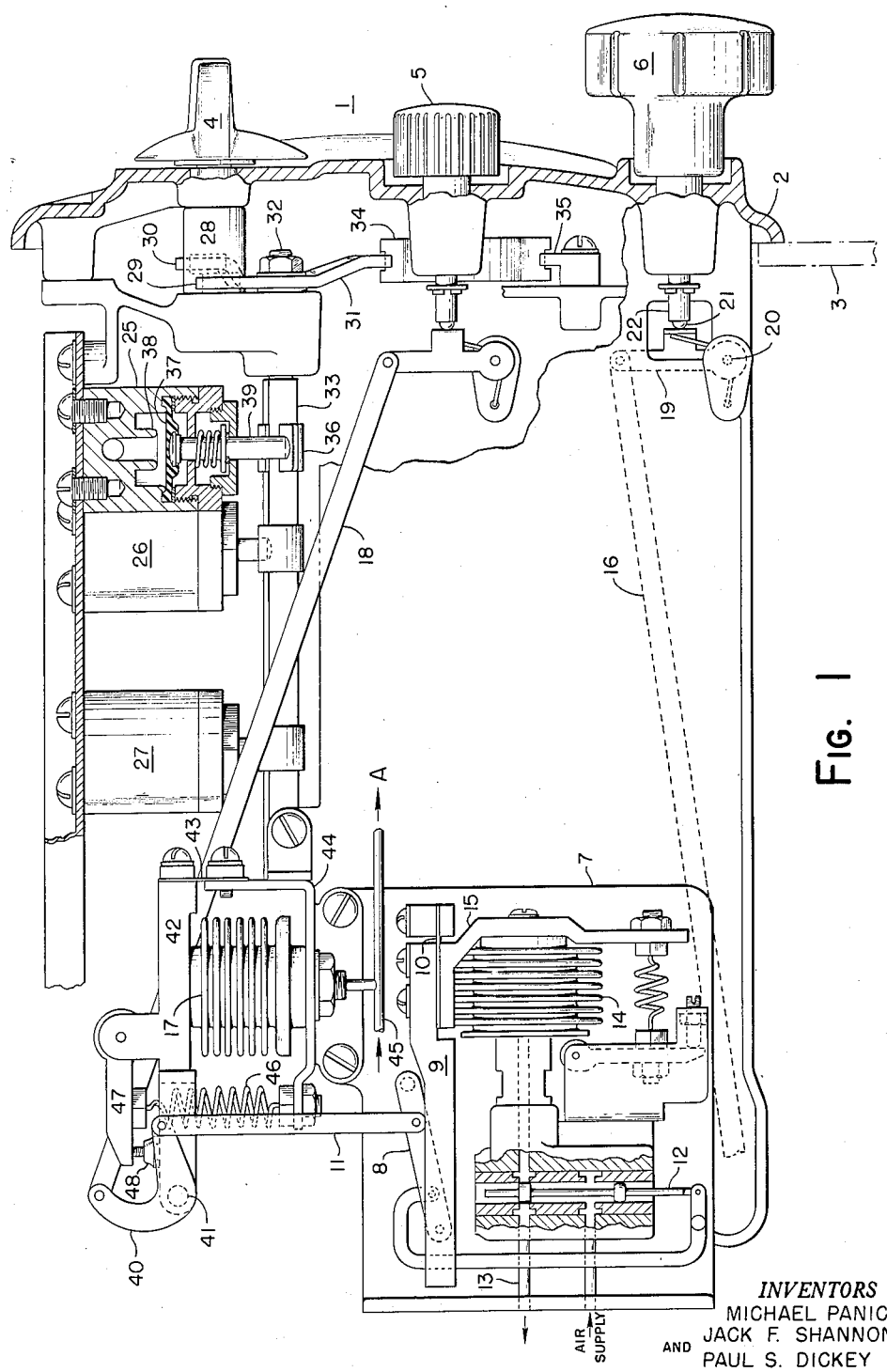

Referring now to Fig. 1, we show therein in side elevation, and partially in section, a fluid pressure selector station 1 having a face plate 2 normally mounted (to the right in Fig. 1) on a control panel 3 with the operating portions of the station normally hidden (to the left) behind the panel 3. On the face plate 2 are three hand operable knobs, 4, 5 and 6, as well as a plurality of vertically parallel indicating scales having cooperating movable pointers. These various elements will be more readily seen in Figs. 2 and 4 which include a front view of the face plate 2.

The station 1 includes two pilot valve assemblies 7 and 7', of which unit 7 is shown in full line while unit 7' is similar but hidden beyond the unit 7. The visible unit 7 will be briefly described although the two are more fully disclosed and are claimed in the copending application of Harvard H. Gorrie SN 169,751, filed June 22, 1950, now Patent No. 2,695,015.

The unit 7 may be described as a pressure regulator having a floating cradle 8 having one end pivoted to, and positioned by, an arm 9 of a bell crank pivotally supported by a leaf-spring 10. The other end of the cradle 8 is positioned by a vertical link 11. Intermediate the ends of the cradle 8 is suspended a pilot 12 controlling air pressure within an output pipe 13 and simultaneously within a restoring bellows 14 which acts upon the other arm 15 of the bell crank. The pilot valve assembly is joined to a supply of air under commercially constant pressure somewhat greater than the maximum desired output pressure in pipe 13. Vertical positioning of link 11 results in corresponding movement of the pilot stem 12 and corresponding increase (or decrease) in air pressure within pipe 13. At the same time the new pressure is felt within the restoring bellows 14 which moves the bell crank 15, 9 around its pivot 10 until the cradle 8 assumes a new position whereby the pilot 12 is restored to shut-off position. Thus the fluid pressure within output pipe 13 is directly in accordance with the vertical positioning of link 11.

Figures 2, 3:
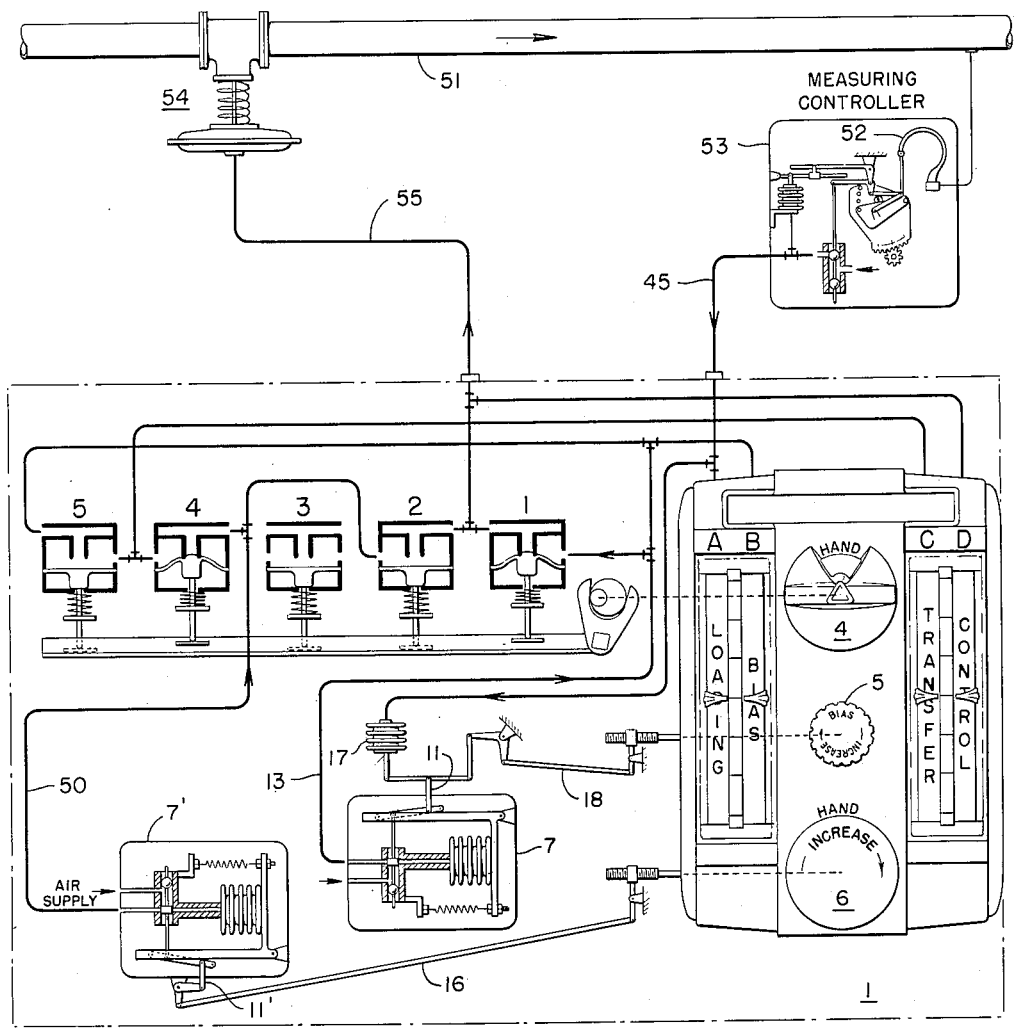
Fig. 3 is a chart of valve positions in connection with Fig. 2.

A brief reference to Fig. 2 will show that the vertical link 11' of unit 7' is positionable by the longitudinal movement of a link 16; while the link 11 of unit 7 is positionable by the resultant of a bellows 17 and longitudinal movement of a link 18.

Returning to Fig. 1 it will be seen that the knob 6 axially moves as it is rotated to angularly position an arm 19 about a center 20 and thus longitudinally move the link 16. The arm 19, and other parts positionable therewith, are spring urged into engagement with the rounded end 21 of the shaft 22 of the knob 6 to take up any lost motion and to provide a firm drive between the axial movement of shaft 22 and angular positioning of arm 19. In similar manner the link 18 is moved in substantially longitudinal manner by turning of the knob 5.

Figure 4:
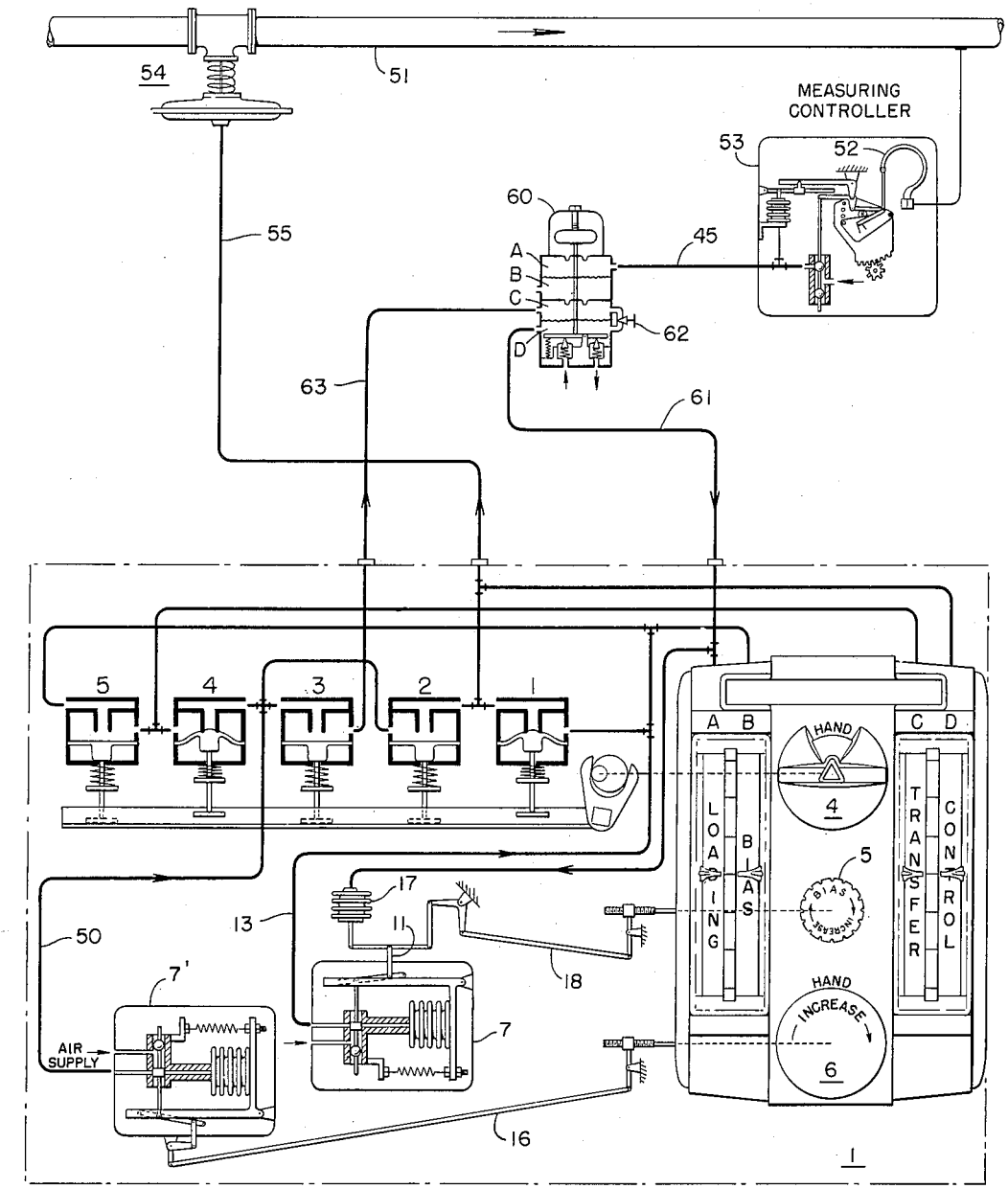
Fig. 4 is similar to Fig. 2 showing the selector station in a somewhat different control installation.

The station 1 provides manual-automatic selective possibilities in the control, by fluid pressure means, of a controllable apparatus or system. The knob 4 has two positions of rest 180° apart and one may be termed an "automatic" position and the other a "hand" position. Actuation of the knob 4 manually between the two positions effectively opens or closes fluid pressure valves of which there are preferably five in each station. Fig. 1 shows three of the valves of which valve 25 is shown open and valves 26, 27 are closed. Figs. 2 and 4 show knob 4 in its "hand" position, with valves (1) and (4) closed while valves (2), (3) and (5) are open. Fig. 3 tabulates the positions of the five valves for "hand" and for "automatic" positions of knob 4.

The knob 4 angularly positions a cam drum 28 having milled thereon two flats staggered axially of the drum and providing rests for the staggered fingers 29, 30 of a fork 31 which is pivoted at 32. The fork 31 is arranged to move a square shaft 33, around the center 32, a total of about 30° for 180° movement of knob 4. Thus 180° motion of the knob 4, in either direction, rotates the drum 40 180° and swings the arm 31 through approximately 30° around its center 32 until the fork arm 29, or 30, seats in its proper rest. Definite snap action is provided through the agency of a pair of bowed springs 34 having one end of each seated in notches of the fork 31 and the other end of each spring seated in a fixed abutment 35.

The square shaft 33 is provided with a plurality of valve actuating clips 36 one of which is shown specifically in connection with the sectioned valve 25 in Fig. 1. It will be apparent from Fig. 1 that a plurality of the valve operating plates 36 may be spaced along the square shaft 33 to cooperate with a similar number of valve assemblies and that the arrangement may be that all of the valves are open in one position of the knob 4 and all closed in the other position of the knob, or that some may be open and some may be closed in either of the two positions. The possibilities of this arrangement are clearly apparent.

While certain details of the valves and valve actuating mechanism are more fully disclosed and claimed in the copending application of P. S. Dickey et al., filed October 10, 1951, Serial Number 251,406, it will be evident that the valve 25 is provided with a molded flexible valve disc 37 which may be moved into or out of engagement with a fixed seat 38 formed in the valve housing. The valve stem 39 is spring loaded by means of a spring. The arrangement is such that the spring forces the disc 37 away from the seat 38 or may be said to be spring loaded to open. Closure of the valve is accomplished by rocking of the shaft 33 to one of its alternate positions, wherein a valve operating plate 36 moves the stem 39 to valve seating position. The body of the valve 25 preferably has four connection points, two above the seat 38 and two below the seat. It does not appear to be necesary in Fig. 1 to show any piping connections to these possible valve openings but they are shown diagrammatically in connection with Figs. 2 and 4 which connect the individual valves up in a complete operable circuit.

The link 18 is pivoted at its far end to one arm of a bell-crank 40. The bell-crank 40 is pivoted, as at 41, near one end of a beam 42 whose other end is pivoted by a leaf-spring 43 to a fixed abutment 44. Beam 42 forms the movable end closure of the bellows 17 whose other end is fixed to the abutment 44. Input fluid loading pressure, representative of a variable, or departure therefrom from a predetermined value, is admitted to the bellows 17 from a pipe 45, and this fluid pressure is visually indicated upon a pressure gage A. Beam 42, and thereby the bellows 17, is loaded by a spring 46 having one end fixed to the abutment 44 and its other (movable) end fastened to a branch 47 of the beam. Spring tension is varied by an adjustment 48 acting between parts 42 and 47. The other end of bell-crank 40 carries the link 11 pivotally suspended therefrom and joining, at its lower end, the floating cradle 8.

It will now be apparent that, assuming the link 18 immovable in a predetermined position, the pressure within pipe 45, acting upon the bellows 17 against spring 46, will position the pilot stem 12 to produce in the output pipe 13 an output fluid presure equal to, or in desired proportionality to, the incoming fluid pressure in pipe 45. If the link 18 is longitudinally moved to angularly position the bell-crank 40 about its pivot 41, and thereby change the vertical position of link 11 (the beam 42 remaining unmoved), the result will be a positioning of pilot 12 and a variation in fluid presure output in pipe 13.

Thus the pressure within pipe 13 may be varied either by change in pressure within pipe 45, or by movement of link 18, or by both. We have therefore, through the agency of knob 5 and link 18, a means for manually biasing the fluid loading pressure of pipe 45 to obtain a biased output fluid pressure in pipe 13.

Referring now to Fig. 2 it will be seen that we there show the selector station 1 with all parts except the front face in somewhat diagrammatic form. The selector knob 4 is shown in "hand' position whereby valves 1 and 4 are closed and valves 2, 3 and 5 are open. Fig. 3 charts the valve positions for the two conditions of "hand" and "automatic". Knob 5 is arranged to position link 18 and to thereby vary the bias of the incoming loading pressure to produce the outgoing control pressure. Knob 6 is arranged to position link 16 to manually establish an output control pressure in a pipe 50.

Fig. 2 diagrammatically illustrates a control of fluid flowing through a conduit 51. Fluid pressure is effective upon a Bourdon tube 52 to actuate a measuring controller 53 of the type disclosed and claimed in the patent to H. H. Gorrie 2,141,464. The assembly 53 contains range and sensitivity, set-point and proportional band, adjustments and functions to provide in the pipe 45 a fluid loading pressure representative of static pressure within the conduit 51.

The measuring controller 53 is a compact assembly of pilot valve, restoring bellows and interrelated linkage which is used to transform into air loading pressures the movement imparted by a condition measuring device such as the Bourdon tube 52. The linkage of the assembly 53 is arranged for convenient adjustment of the control set-point and proportional band for sensitivity. The restoring bellows is used to combine greater speed and loading pressure changes with stability in the control system operation. While other forms of measuring devices may be used to establish the loading pressure within the pipe 45, we have chosen to indicate the measuring controller 53 because it incorporates the set-point and proportional band adjustments usually desirable in a control system. The restoring bellows allows large initial change, counteracted by the capillary resistance on a time basis, and ends up with the pilot land position and loading pressure both geared to the meter.

In Fig. 2 the selector station 1 is intermediate the measuring controller 53 and a fluid flow control valve 54 for controlling the rate of flow of fluid in the conduit 51 and/or the pressure effective upon the Bourdon tube 52. The selector station 1 has the primary function of allowing automatic positioning of the valve 54 from the measuring controller 53, or selectively to cut off the effect of the measuring controller 53 and place the positioning of the valve 54 directly under remote manual actuation by way of the knob 6. As shown in this figure the selector station 1 is in "hand" position with valves 1 and 4 closed and valves 2 and 5 open, while valve 3 is not used.

Under this condition it will be apparent that the loading pressure established by the measuring controller 53, in the pipe 45, is observable by the pointer and scale A on the face of the selector station. This pressure is effective within the bellows 17 and the bias loading pressure (the bias may be zero effect) in pipe 13 appears as a value indicated by pointer and scale B. At the same time it appears as indicated by the transfer pointer C. With the selector station on "hand" the positioning of the valve 54 is under control of the knob 6 which regulates the output pressure of the device 7', in the pipe 50, through valve 2, and in the pipe 55 leading to the valve 54. This same pressure is visually indicated by the pointer D. Thus, under "hand" operation the scale A shows the "loading pressure" continuously established by the measuring controller 53. Scales B and C show the biased loading pressure. If bias is zero then scales A, B and C will read alike and may all be different from the value of scale D. Scale D indicates the pressure in the pipe 55, manually adjusted by knob 6, and which is effective in positioning the valve 54.

When it is desired to change the regulation of valve 54 from "hand" to "automatic" it may be accomplished by opening valves (1) and (4) while simultaneously closing valves (2) and (5) through manually turning knob 4 180° (in either direction) to the "automatic" position. However, before making this switch-over, it is advisable to first see that no undesirable jolt of operating pressure would be imposed upon valve 54 when knob 4 is switched, i. e. that the control pressure effective on valve 54 (indicated on D) is the same that will be impressed upon pipe 55 from pipe 45 (plus bias). In other words, that D under "hand" is the same as B, C. If C pressure is more (or less) than D then the bias knob 5 should be turned until C=D. The switch from "hand" to "automatic" may now be made by knob 4 and the pressure in pipe 55 will be unchanged. Then a comparison of the A and B scale readings should be made to see that the degree of desired bias is not exceeded in one direction or the other. If it is more or less than is desired then the bias is slowly removed or advanced, thus slowly moving the control valve 54 until the valve 54 is under complete automatic control of the measuring controller 53 with whatever degree of bias is desired being imposed between the pressures of pipe 45 and pipe 55.

Under "automatic" position the A scale will show the loading pressure, as before, from the measuring controller. The B scale will show the biased loading pressure while the C scale will show a pressure which is the pressure last set up by the hand knob 6 when the system was under "hand" control. The D scale again shows the control pressure going to the valve as established in this instance by the device 7 and under this condition the B and D scales will read alike. Regardless of extent of bias $B=D$. If the bias is zero, then $A=B=D$.

Before switching from "automatic" to "hand" it is advisable to see that C is not different than D. If there is a difference, then vary C by turning knob 6 until $C=D$ and then switch knob 4 from "automatic" to "hand".

With the transfer knob 4 on "automatic" operation the bias applied to an incoming loading pressure (pipe 45) from a measuring controller (53) may be determined by noting the difference in pressure readings between A and B. When these readings coincide, no bias exists and the outgoing control pressure (D) will be equal to A and B.

In Fig. 4 we show the selector station 1 inserted between the measuring controller 53 and the valve 54 in a somewhat different control system than that of Fig. 2. Herein, additionally we show a standardizing relay 60 which may be of the type disclosed and claimed in the patent to Dickey 2,098,913.

The loading pressure of the pipe 45 is admitted to the A chamber of the relay 60. The B chamber is open to the atmosphere. In the D chamber is the resultant pressure output of the relay effective in a pipe 61 and visible upon the A scale of selector station 1. An adjustable bleed 62 is provided between the D and C chambers of the relay providing reset and standardizing regenerative action.

In this control system the No. 3 valve is used and, in the "hand" position shown, the output pressure of device 7', available in the pipe 50, passes through the valve 3 to a pipe 63 which joins the C chamber of the relay 60. Thus the bleed 62 is effectively overruled by imposing upon the C chamber the pressure established manually by the device 7' and which is at the same time effective within the pipe 55 for positioning the valve 54. Under "hand" control the measuring controller 53 continues to impress its output pressure in pipe 45 upon the relay 60 and the final loading pressure output of the relay 60, available in pipe 61 and in the bellows 17, would possibly be quite erratic at time of future switch-over from hand to automatic. Thus, during "hand" control the bleed 62 is by-passed by the pipe 63.

While we have chosen to illustrate and describe certain preferred embodiments of our invention, it will be understood that this is by way of example only, and is not to be considered as limiting.

What we claim as new, and desire to secure by Letters Patent of the United States, is:

1. A selector station for a fluid pressure control system wherein a fluid pressure is produced by a variable representative of a condition and said condition is controlled either manually or automatically through said selector station, comprising in combination; a plurality of two-position valves; means for simultaneously mechanically actuating the valves, hand operated switching means for giving the mechanical actuating means two positions of rest; a hand actuated means for establishing a fluid pressure; input piping upon which is imposed a fluid pressure responsive to a variable; an expansible-contractible means responsive to the fluid pressure of the input piping; a pilot valve actuated by the expansible-contractible means for producing an output loading pressure; a mechanical means acting on the pilot valve in conjunction with the expansible-contractible means to bias the output loading pressure; output piping connected to some of the plurality of valves whose actuation selectively controls the condition in accordance with the manually controlled fluid pressure and that of the pilot valve; and two groups of substantially linear parallel pressure gage scales including cooperating pointers indicating the input and output fluid pressures; including, a first group having two pointers, a first of which continuously indicates the fluid pressure of the input piping, and a second of which is selectively actuated by the valves to indicate the fluid pressure output of the pilot valve and the fluid pressure output of the hand actuated means, a second group having two pointers, a first of which continuously indicates the fluid pressure of the output piping, and a second of whch is selectively actuated by the valves to indicate the output of the pilot valve and the fluid pressure output of the hand actuated means.

2. The selector station of claim 1 in which, a standardizing relay is included in the input piping, and the output piping is arranged with the relay to eliminate its standardizing action when the condition is controlled manually.

References Cited in the file of this patent

UNITED STATES PATENTS

| | | |
|---|---|---|
| 1,959,889 | Wunsch | May 22, 1934 |
| 2,202,286 | Gorrie | May 28, 1940 |
| 2,202,485 | Fitch | May 28, 1940 |
| 2,284,795 | Belaef | June 2, 1942 |
| 2,369,887 | Eckman | Feb. 20, 1945 |
| 2,405,979 | Rosenberger | Aug. 20, 1946 |
| 2,409,871 | Krogh | Oct. 22, 1946 |
| 2,484,000 | Macgeorge | Oct. 4, 1949 |
| 2,529,254 | Ives | Nov. 7, 1950 |
| 2,588,799 | Booth | Mar. 11, 1952 |
| 2,594,136 | DiMaggio | Apr. 27, 1952 |